July 23, 1946.    C. JOBST    2,404,500
TRIMMING MECHANISM
Filed May 11, 1944    2 Sheets-Sheet 1

INVENTOR.
CONRAD JOBST
BY
*Whittemore Hulbert & Belknap*
ATTORNEYS

July 23, 1946.  C. JOBST  2,404,500
TRIMMING MECHANISM
Filed May 11, 1944  2 Sheets-Sheet 2
FIG.6.
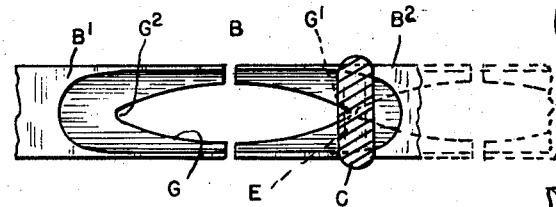
FIG.7.
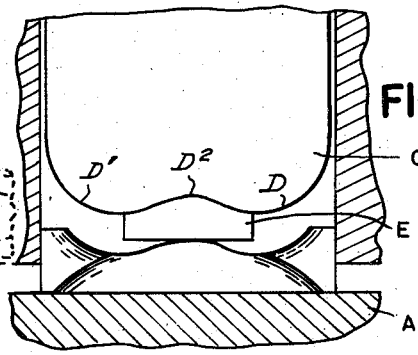
FIG.5.
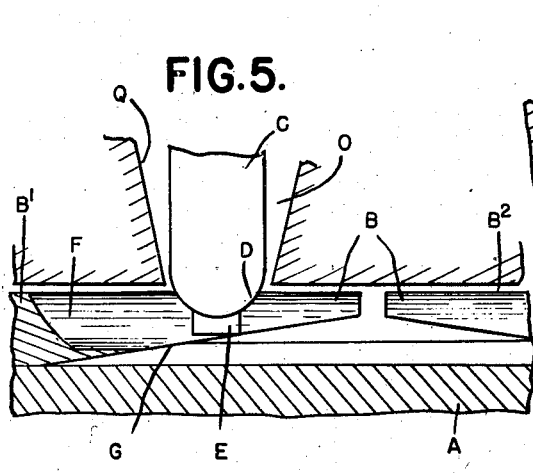
FIG.4.
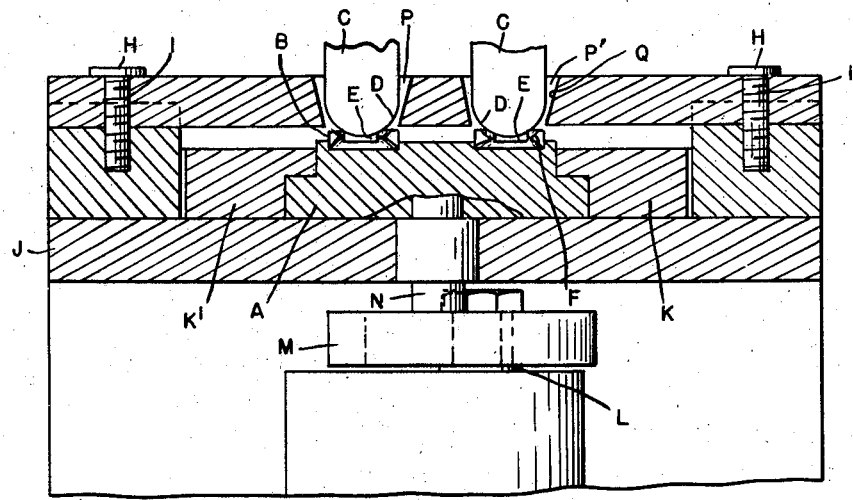
FIG.3.
INVENTOR
CONRAD JOBST
BY
Whittemore Hulbert & Belknap
ATTORNEYS Patented July 23, 1946

2,404,500

UNITED STATES PATENT OFFICE 2,404,500

TRIMMING MECHANISM

Conrad Jobst, Toledo, Ohio, assignor to The Toledo Automatic Brush Machine Company, Toledo, Ohio, a corporation of Ohio Application May 11, 1944, Serial No. 535,165

5 Claims. (Cl. 164—47)

The invention relates to trimming mechanisms and has more particular reference to a construction adapted for the specific use in the trimming off of sprue stubs from molded plastic articles. The device is, however, useful for other purposes.

It is the object of the invention to obtain a construction which will quickly remove the projecting stub and will impart to the article a smooth finished surface free from cracks or other defects and in continuation of the molded surface.

It is a further object to obtain a construction which is adapted for the trimming of fashioned articles other than those formed of molded plastics. With these objects in view, the invention consists in the construction, as hereinafter set forth.

In the drawings:

Fig. 3 is a horizontal section substantially on line 3—3, Fig. 2;

Fig. 4 is an enlarged section similar to a portion of Fig. 3;

Fig. 5 is a section on line 5—5, Fig. 4;

Fig. 6 is a diagram illustrating the operation of the trimmer; and

Fig. 7 is a section similar to Fig. 4 illustrating a modified construction.

Figure 1:
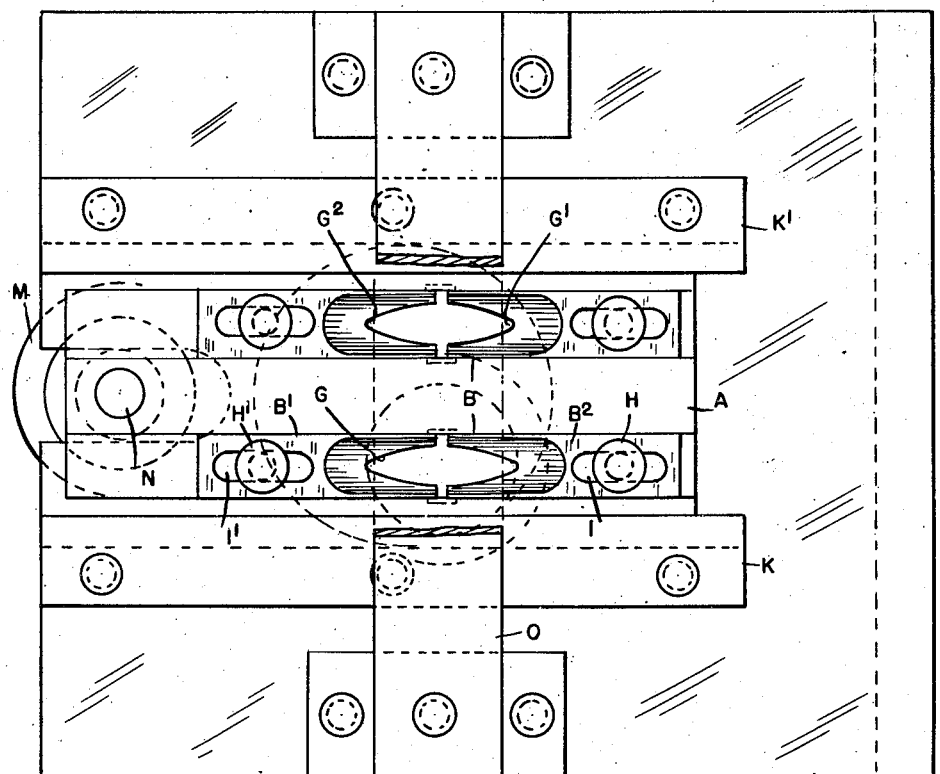
Fig. 1 is a front elevation of my improved trimmer.
Figure 2:
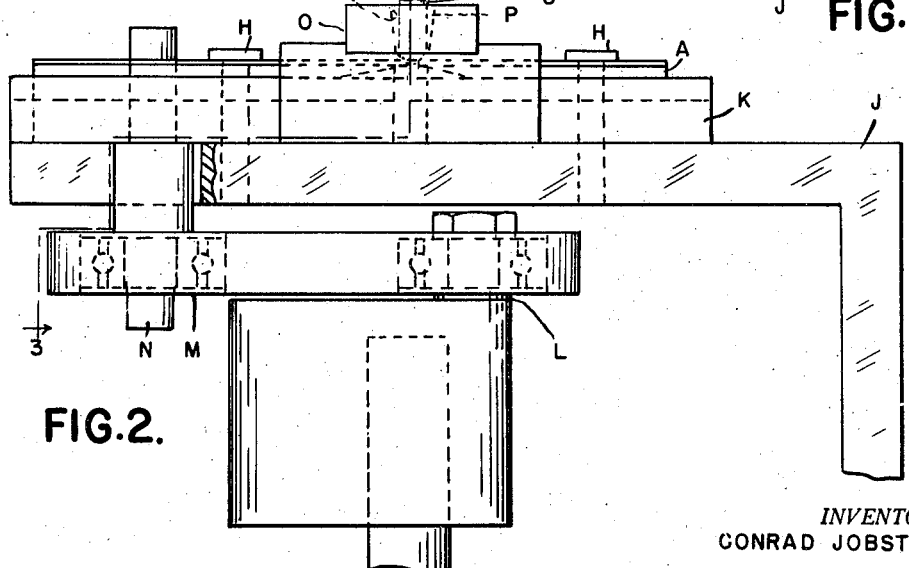
Fig. 2 is a side elevation partly in section.

Articles formed of synthetic plastic materials are usually molded in gates in which the individual articles are connected by sprues. When these articles are detached, the sprue stubs must be removed and, unless this operation is carefully performed, it will leave a blemish in the finished surface. This is for the reason that the stresses incident to the cutting off of the stub may form a crack or a breaking out of material below the finished surface. Consequently, this operation is usually manually performed requiring great care on the part of the workman and adding to the cost of production.

My improvement is designed to greatly expedite the trimming operation and to avoid any marring of the finished surface, the construction being as follows. A is a reciprocatory member on which is mounted one or more cutters B. Each of these cutters has a cross sectional contour corresponding to the finished surface of the article to be trimmed. As specifically illustrated in Figs. 4 and 5, this article is a molded plastic toothbrush handle C having a rounded end D with the sprue stub E projecting therefrom. The cross sectional contour F of the cutter B corresponds to the rounded end D, Fig. 4, thereby limiting the inward movement of the handle being trimmed. The cutting edges of the cutter are formed by grinding the member B in oppositely inclined planes oblique to the plane of reciprocation and on the opposite side from the contour F. This will form a substantially oval line of intersection G with the contour surface having substantially V-shaped opposite end portions G', G² and leaving therebetween an aperture through which the stub may be fed. For convenience in grinding the cutter and for permitting resharpening of the same, the cutter B is preferably formed in two sections B' and B² which are separately adjustably mounted on the member A by bolts H, H' passing through slots I, I' therein. This also permits of relatively adjusting said section so as to have an exact dimension between the apices of the portions G', G².

The reciprocatory member A is mounted on a suitable frame J having guideways K and K'. Movement is imparted to the member A by any suitable mechanism such as a crank L connected by a rod M to a pin N projecting rearward from said member. The throw of the crank L is such as to impart to the member A an amplitude of movement which is slightly greater than the dimension between the apices G', G² of each cutter for a purpose hereinafter described. The frame J has also mounted on the front face thereof a member O in which are formed apertures P, P' in alignment respectively with the center line of each of the cutters B. Each of these apertures is also in alignment with a point in said center line which substantially registers with the apices G', G² when at opposite ends of the reciprocatory movement of the cutter. These apertures permit of feeding the work therethrough into engagement with the cutters and also form positioning means therefor. As shown, the walls Q of the apertures P and P' are flared in an outward direction so as to permit of slightly rocking the work during engagement thereof with the cutter.

Operation

When the machine is in operation, a very rapid reciprocatory movement is imparted to the member A by the crank L and rod M, the crank being driven by any suitable means (not shown), such as an electric motor. The operator may then feed the work such as a toothbrush handle C through the guide bringing the sprue E in contact with the contour F of the cutter B. As the sprue is of a width less than that of the aperture formed by the cutting edge G, it can pass through said aperture but, on account of the rapidity of reciprocatory movement, will be inserted only a slight amount before engagement with said cutting edge. Consequently, the material of the stub will be successively removed in thin shavings until further inward movement of the member C is prevented by contact of the surface D with the surface F. At this point the shaved surface will form a continuation of the surface D.

An essential feature in the operation above described is that the cutting edge does not travel completely across the stub or projection in either of the reciprocatory movements of the cutter. Preferably, the movement is reversed when the cutting edge has only slightly passed the center of the stub and, therefore, a substantial amount of material remains in said stub as a backing for the portion shaved. As a consequence, there is no danger of either cracking or breaking out material from beneath the line of cut as might be the case if the cutting edge were to completely traverse the area of the projecting stub. It will also be observed that the direction of movement of the cutting edge is substantially radially inward from all portions thereof, this being due to its oval or reverse V-shaped form. The result will be the forming of a smooth finished surface in continuation of the molded surface of the article. Furthermore, as the guide or positioning means permits of rocking the work, the finished surface will also conform to the molded surface in a transverse plane. By having a pair of adjacent trimmers simultaneously operating, the attendant can hold a piece of work in each hand and simultaneously perform both trimming operations.

The modified construction shown in Fig. 7 is substantially the same as that shown in Fig. 4 with the exception that the contour of the handle is a different curve. Thus, instead of the single arcuate curve shown in Fig. 4, there are two smaller curves D' on opposite sides of the end of the handle and a re-entrant curve $D^2$ therebetween. The cutter is formed to a similar contour and the operation is substantially the same as with the other construction.

What I claim as my invention is:

1. The method of trimming off projections from a fashioned surface of an article which consists in reciprocating a pair of aligned cutters having opposed spaced cutting edges, giving said reciprocations an amplitude of reciprocatory movement being substantially equal to the dimension between said opposed edges, and in feeding the article toward said cutter at a point substantially in registration with the opposite limits of movement of said cutting edges.

2. A trimming mechanism comprising a reciprocatory member, a pair of aligned cutters mounted on said member having opposed cutting edges spaced from each other by a dimension slightly less than the amplitude of reciprocatory movement, and means for holding the work to be trimmed in operative relation to said cutter at a point substantially in registration respectively with said opposed edges at opposite ends of the reciprocatory movement thereof.

3. A trimming mechanism comprising a reciprocatory member, a pair of aligned cutters mounted on said member having opposed cutting edges flaring from spaced apices towards a center therebetween, the amplitude of reciprocatory movement being but slightly greater than the dimension between said apices, and means for holding the work to be trimmed in operative relation to said cutter at a point substantially in registration respectively with said opposed edges at opposite ends of the reciprocatory movement thereof.

4. A trimming mechanism comprising a reciprocatory member, a pair of aligned cutters mounted thereon having an extended surface of a cross sectional contour corresponding to the desired contour in the article to be trimmed, said surface being apertured to form a surrounding cutting edge having apices at opposite ends thereof spaced from each other by a dimension substantially equal to the amplitude of reciprocatory movement, and means for holding the work to be trimmed in operative relation to said cutter at a point substantially in registration with said opposed edges at opposite ends of the reciprocatory movement thereof.

5. A trimmer mechanism comprising a reciprocatory member, a pair of cutters mounted thereon, each having an extended surface of a cross sectional contour corresponding to the desired contour in the article to be trimmed, each of said cutters being cut away in an oblique plane from the side opposite to said extended surface to intersect the latter and form an aperture therein with a surrounding cutting edge having an apex at one end thereof, said cutters being relatively adjustably mounted on said reciprocatory member to space the apices by a dimension slightly less than the amplitude of reciprocatory movement and with the cutting edges opposed to each other, and means for holding the work to be trimmed in operative relation to said cutter at a point substantially in registration with said apices respectively at opposite ends of the reciprocatory movement.

CONRAD JOBST.